United States Patent Office 3,536,665
Patented Oct. 27, 1970

3,536,665
LINEAR POLYESTERS OF 4,4' DICHLOROCARBONYLDIPHENYLSULFONE AND AROMATIC DIHYDROXY COMPOUNDS AND THEIR METHOD OF PREPARATION
Edward W. Pietrusza, Morristown, and Jack R. Pedersen, Parsippany, N.J., assignors to Allied Chemical Corporation, New York, N.Y., a corporation of New York
No Drawing. Filed May 25, 1967, Ser. No. 641,129
Int. Cl. C08g *17/03, 17/08, 33/10*
U.S. Cl. 260—49          4 Claims

ABSTRACT OF THE DISCLOSURE

This spcification discloses a new class of linear aromatic polyesters from 4,4'-dichlorocarbonyldiphenylsulfone and aromatic dihydroxy compounds and a method for preparing them. Copolyesters and terpolyesters wherein other acid components and/or mixtures of dihydroxy compounds are employed are also disclosed. The polymers of the invention are prepared by reacting the starting materials in a solvent in the presence of a catalyst under anhydrous conditions at normal pressures and moderate temperatures. The polymers are stable at high temperatures and are useful in the formation of fibers, films, molded articles, and the like, particularly for high temperature applications.

---

Glycol esters of 4,4'-dicarboxydiphenylsulfone are known to form polymers which have higher melting points than the corresponding glycol esters of other aryl dicarboxylic acids, such as the glycol esters of terephthalic acid, using conventional condensation polymerization techniques. Such methods employ high temperatures and/or vacuum distillation to bring about condensation between the glycol reactant and the dicarboxylic acid reactant. The condensation reaction between 4,4'-dicarboxydiphenylsulfone or its ester and an aromatic dihydroxy compound does not occur readily using conventional condensation techniques. Due to the high melting points of the polymers, very high temperatures must be employed which promote degradation of the resultant polyesters and prevent the formation of polymers having high molecular weights. The stringent reaction conditions also add substantially to the costs of these processes.

Linear aromatic polyesters have been disclosed by Conix et al., U.S. Pat. 3,028,364, issued Apr. 3, 1962. In that disclosure, the acid chloride of 4,4'-dicarboxydiphenylsulfone was dissolved in a solvent and reacted with an aqueous solution of the sodium salt of a bisphenol. While that polymerization process can be conducted at moderate temperatures, it does not lend itself to the preparation of sulfone polyesters of high molecular weights such as are required for the preparation of fibers and the like.

It is a principal object of the present invention to provide linear aromatic sulfone polyesters.

It is another object to provide novel polyesters from 4,4'-dicarboxydiphenylsulfone and an aromatic dihydroxy compound.

It is a further object to provide copolymers and terpolymers from 4,4'-dicarboxydiphenylsulfone and aromatic dihydroxy compounds.

It is another object to provide novel polyesters, copolyesters, and terpolyesters derived from 4,4'-dicarboxydiphenylsulfone and an aromatic dihydroxy compound having high molecular weights suitable for the preparation of fibers, films, and molded articles.

It is another object to provide a process for the preparation of high molecular weight polyesters derived from 4,4'-dicarboxydiphenylsulfone and aromatic dihydroxy compounds at moderate temperatures and normal pressures.

Further objects will become apparent from the following detailed description thereof.

We have discovered that linear high molecular weight aromatic polyesters derived from 4,4'-dichlorocarbonyldiphenylsulfone and aromatic dihydroxy compounds can be prepared readily at moderate temperatures and normal pressures by reacting them in equimolar amounts in a catalyzed solution under anhydrous conditions. The polyesters of the invention have high glass transition temperatures, high flow temperatures, and high decomposition temperatures, and are useful for the production of fibers, films, coatings, and molded articles, particularly for high-temperature applications. In addition to the polyesters of the invention, a wide variety of copolyesters and terpolyesters can be prepared in similar manner from mixtures of starting materials. For example, 4,4'-dichlorocarbonyldiphenylsulfone can be admixed with one or more different aromatic or aliphatic dicarboxylic acid chlorides and/or the aromatic dihydroxy reactant can be admixed with one or more different aromatic or aliphatic dihydroxy compounds.

According to the process of the invention, 4,4'-dichlorocarbonyldiphenylsulfone, alone, or in admixture with other dicarboxylic acid chlorides, is reacted in a catalyzed solution with an aromatic dihydroxy reactant. The mixture is reacted at least until evolution of hydrogen chloride has ceased. The polymer product is then isolated. By varying the conditions of time and temperature of reaction and concentrations and types of starting materials, a wide range of polyesters, copolyesters and terpolyesters can be prepared having determinable molecular weights and properties.

Equimolar amounts of the 4,4'-dichlorocarbonyldiphenylsulfone reactant and the dihydroxy reactant are preferred in our process since the presence of an excess of either reactant will act as a terminator for the polymerization reaction resulting in the formation of low molecular weight polyesters.

The solvent should be a solvent for both the 4,4'-dichlorocarbonyldiphenylsulfone reactant and the dihydroxy reactant and preferably for the resultant polyester, although this is not required. In general, aromatic hydrocarbons and halogenated aromatic hydrocarbons are solvents which may be employed in the process of the invention, including benzene, toluene, o-xylene, m-xylene, p-xylene, p-cymeme, diphenylmethane, 1,3,5-triethylbenzene, chlorobenzene, o-dichlorobenzene, 1,2,4-trichlorobenzene, and the like. In general, the use of higher boiling solvents will result in the formation of high molecular weight polymers.

Effective catalysts include certain metals and their salts such as magnesium metal, zinc metal, aluminum metal and cuprous chloride. The catalysts which are useful are quite specific since similar metals and salts including nickel metal, copper metal and zinc chloride were found to be ineffective as catalysts. Additional metals and metallic salts which are effective as catalysts in the process of the present invention can be determined by one skilled in the art. The catalyst concentration can be from 0.01 to 2.00 wt. percent. In the absence of an effective catalyst, only low molecular weight polyesters are obtained. Particularly outstanding results were obtained with magnesium metal catalyst.

The polymerization reaction proceeds readily at the reflux temperature of the reaction mixture which depends upon the boiling point of the solvent employed during polymerization. In general, the rate of polymerization will increase at higher temperatures of reaction.

The time required for the formation of high molecular weight polyester will vary depending upon the temperature of the reaction, the purity of the reactants and the choice of catalysts. The reactants and the solvent must be essentially free from impurities and water which cause degradative side reactions and chain termination and prevent the formation of high molecular weight polymer. Increasing the time of reaction increases the molecular weight of the resultant polymer with accompanying increases in glass transition temperature, flow temperature, and decomposition temperature.

4,4'-dichlorocarbonyldiphenylsulfone can be prepared by reaction of 4,4'-dicarboxydiphenylsulfone with a solution of phosphorous pentachloride and phosphorous oxychloride. The excess oxychloride is distilled off, and the product can be isolated by distillation or recrystallization from a suitable solvent.

Acyl chloride derivatives of other dicarboxylic acids can be added as part of the acid chloride reactant. Such dicarboxylic acids include aliphatic dicarboxylic acids such as oxalic acid, malonic acid, succinic acid, adipic acid, suberic acid, $\alpha$-ethyl suberic acid, sebacic acid, dodecanedioic acid, $\alpha,\alpha$-diethyl adipic acid and the like. Substituted aliphatic acids such as ortho-, meta- or para-phenylene diacetic acid and o-phenylene acetic-$\beta$-propionic acid, aromatic dicarboxylic acids such as phthalic acid, isophthalic acid, terephthalic acid, 4,4'diphenyldicarboxylic acid, 4,4'-diphenyletherdicarboxylic acid, 4,4'-diphenylmethanedicarboxylic acid, 2,2-(4,4'-dicarboxydiphenyl)propane, 4,4'-dicarboxydiphenyldichloromethane, and the like.

The aromatic dihydroxy compounds suitable for use in the invention include aromatic diols and bisphenols wherein each reactive hydroxy radical is directly attached to a benzene ring. Suitable compounds, for example, include 1,2-dihydroxybenzene,
1,3-dihydroxybenzene,
1,4-dihydroxybenzene,
2-chloro-1,4-dihydroxybenzene,
bis(4-hydroxyphenyl)dimethylmethane,
1,4-bis(p-hydroxycumyl)benzene,
4,4-bis(hydroxyphenyl)sulfone,
2,2-bis(4'-hydroxyphenyl)-1,1a,3,3a,4,5,5,5a,5b,6-decachlorooctahydro-1,3,4-metheno-2H-cyclobuta[cd] pentalene and its derivatives having the formula

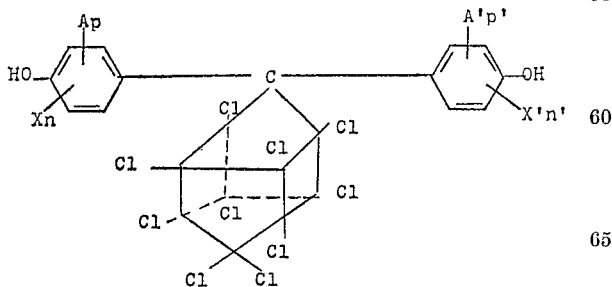

wherein each node represents a tetravalent carbon atom, A, A', X and X' represent hydrogen substitutes in a position ortho to the phenolic hydroxy group, A and A' are alkyl radicals having from 1 to 3 carbon atoms, X and X' are halogens independently selected from the group consisting of chlorine and bromine; $n$ and $n'$ are integers from 0 to 2; $p$ and $p'$ are integers from 0 to 2; the sum of $n$ and $p$ are less than 3 and the sum of $n'$ and $p'$ are less than 3.

These compounds, hereinafter referred to as Kepone bisphenols, can be prepared by reacting a $C_{10}Cl_{10}O$ ketone (1,1a,3,3a,4,5,5,5a,5b,6 - decachlorooctahydro - 1,3,4 - metheno-2H-cyclobuta[cd]-pentalene-2-one) or a hydrate thereof with the corresponding phenol compound having a free para position at an elevated temperature in the presence of an acid catalyst. A suitable process for preparing such Kepone bisphenols employing a boron trifluoride catalyst is disclosed in U.S. Pat. 3,370,086; and a process employing a sulfonic acid catalyst is disclosed in U.S. Pat. 3,420,894.

Mixtures of more than one aromatic dihydroxy compound can be employed, including mixtures containing for example 1,3-dihydroxybenzene and 1,4-dihydroxybenzene or an aliphatic dihydroxy compound can be substituted in part for the aromatic dihydroxy compound. Suitable aliphatic dihydroxy compounds include the polymethylene glycols having from 2 to 10 carbon atoms such as ethylene glycol, 1,5-pentanediol, 1,10-decanediol and other glycols of this series, branched chain glycols such as 2,2-dimethyl-1,3-propanediol, 2-methyl-1,5-pentanediol and the like and carbocyclic glycols such as 1,4-di(hydroxyethyl)benzene, 1,4 - bis(2'-hydroxyethyl)-2,5-dichlorobenzene and the like. Derivatives of any of the above glycols bearing one or more substituents which will not interfere with the formation of high molecular weight linear polyesters, such as nitro-substituted glycols, can also be employed.

The polymer product can be isolated in any convenient manner such as will be known to one skilled in the art. One convenient method is to filter off the catalyst and pour the reaction mixture into a nonsolvent for the polymer. The precipitated polymer can be further purified by washing and drying to remove solvent.

The polymers prepared in accordance with the invention are high melting, thermoplastic materials of high molecular weights suitable for use as fibers, films, and other shaped articles which may be formed from the polymer by conventional techniques such as molding, extrusion, and the like. These polymers are also useful as coatings which offer protection against the effects of elevated temperature.

The following examples are given to further illustrate the invention, but it is to be understood that the invention is not meant to be limited to the details disclosed therein.

In the examples all parts are by weight unless otherwise noted. The reduced viscosity of the polymers was determined as a 0.52% by weight solution in m-cresol at 25° C. Glass transition temperatures, referred to as Tg and decomposition temperatures were determined by differential thermal analysis except when otherwise noted. The tensile property measurements reported were carried out using an Instron tensile tester operated at a constant speed crosshead separation of 0.5 inch per minute.

EXAMPLE 1

228 parts of 2,2-bis(4-hydroxyphenyl)propane, 340 parts of 4,4'-dichlorocarbonyldiphenylsulfone, 2.4 parts of powdered magnesium and 2500 parts by volume of monochlorobenzene were charged to a reaction vessel fitted with a magnetic stirrer and a reflux condenser. The reaction mixture was refluxed for 9.5 hours under nitrogen when evolution of hydrogen chloride had ceased. The resultant mixture was filtered through glass wool and the filtrate poured into 7500 parts by volume of isopropanol. The solid polymer product was ground, washed with isopropanol and dried.

The polymeric product had a flow point of 310–330° C. The reduced viscosity was 0.41. The Tg was 220° C. and the polymer decomposed at 430–450° C. A good film was cast from a monochlorobenzene solution.

Infrared analysis confirmed the structure for a linear polymer having recurring units of the formula

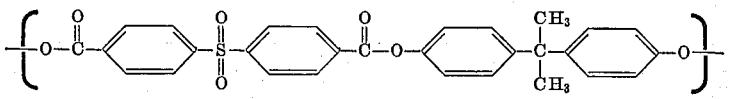

EXAMPLE 2

228 parts of 2,2-bis(4-hydroxyphenyl)propane, 343 parts of 4,4'-dichlorocarbonyldiphenylsulfone, 2.5 parts of powdered magnesium and 3000 parts by volume of freshly distilled o-dichlorobenzene were charged to a vessel as in Example 1 and refluxed for 10 hours. Some product had precipitated out and was redissolved on heating. The solution was filtered and poured into isopropanol when the product precipitated out. It was ground and washed with isopropanol and dried at 120° C. for 3 days.

A polymer having a reduced viscosity of 1.06, softening point of 330–340° C., and Tg of 200° C. was obtained.

The decomposition temperature was 450° C.

A clear, slightly yellow sheet was molded from the polymer at 340° C. and 15 tons pressure for one minute.

A self-sustaining film was cast from a 4% solution in dimethylformamide.

EXAMPLE 3

346 parts of 1,4-bis(p-hydroxycumyl)benzene, 343 parts of 4,4'-dichlorocarbonyldiphenylsulfone, 2.4 parts of powdered magnesium and 6500 parts by volume of freshly distilled o-dichlorobenzene were charged to a vessel as in Example 1 and refluxed for 10 hours. The solution was poured into isopropanol and the precipitated product washed and dried.

The reduced viscosity of the polymer was 0.57. The polymer had a softening point of 290–325° C. and decomposition point of 480–500° C. The glass transition temperature was 226° C.

The structure was confirmed as having recurring units of the formula

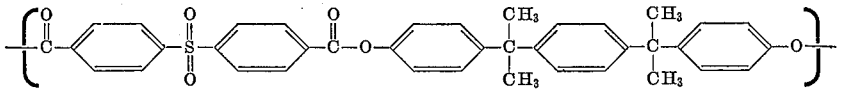

The polymer was compression-molded (at 340° C.) into thin clear sheets having high strength.

EXAMPLE 4

132 parts of Kepone bisphenol, purified by recrystallizing from 85% aqueous methanol, treating with decolorizing carbon and drying in a vacuum oven, 68 parts of 4,4'-dichlorocarbonyldiphenylsulfone, 4.8 parts of powdered magnesium and 2000 parts by volume of freshly distilled o-dichlorobenzene were charged to a vessel as in Example 1 and refluxed for 15 hours. The resultant solution was poured into isopropanol. The precipitated polymer was ground, extracted with hot isopropanol, filtered, and dried in a vacuum oven.

The polymer had a reduced viscosity of 0.26. It was a high melting material having a flow point over 360° C. The decomposition temperature was 450° C. A self-sustaining film was cast from o-dichlorobenzene.

Infrared analysis confirmed the structure for a polymer having recurring units of the formula

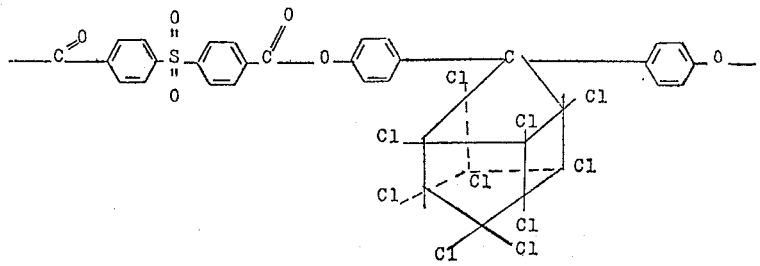

EXAMPLE 5

154.3 parts of Kepone bisphenol, 53.4 parts of 2,2-bis(4-hydroxyphenyl)propane, 160.5 parts of 4,4'-dichlorocarbonyldiphenylsulfone (mol ratio 0.5:0.5:1), 1.2 parts of powdered magnesium and 3000 parts by volume of o-dichlorobenzene were charged to a vessel as in Example 1 and refluxed for 18 hours. The solution was filtered and poured into isopropanol. The precipitated product was washed with isopropanol and dried.

The reduced viscosity of the polymer was 0.54. A clear film was cast from o-dichlorobenzene. The polymer had a very high softening point of over 360° C., a Tg of 220° C., and decomposition temperature of 415° C.

EXAMPLES 6–12

A series of copolymers was prepared following the procedure given in Example 5, varying the diacid component by admixing 4,4'-dichlorocarbonyldiphenylsulfone with equimolar amounts of an aliphatic or aromatic diacid and by admixing the aromatic dihydroxy compound with equimolar amounts of a different aromatic or aliphatic dihydroxy compound. The examples are summarized in the table below:

| Example | Diacid components | Dihydroxy component | Reduced viscosity | Flow temp., °C. | Tg, °C. | Decomposition temp., °C. |
|---|---|---|---|---|---|---|
| 6 | 4,4'-dichlorocarbonyl-diphenylsulfone and adipyl chloride. | 2,2-bis(4-hydroxyhenyl)propane | 00.99 | 265–295 | 160 | >400 |
| 7 | 4,4'-dichlorocarbonyl-diphenylsulfone and sebacyl chloride. | do | 10.02 | 235–265 | 133 | 400 |
| 8 | 4,4'-dichlorocarbonyl-diphenylsulfone and isophthaloyl chloride. | do | 00.26 | 235–260 | 196 | 450 |
| 9 | 4,4'-dichlorocarbonyl-diphenylsulfone and adipyl chloride. | 1,4-bis(p-hydroxycumyl)benzene | 00.96 | 240–280 | 160 | >400 |
| 10 | 4,4'-dichlorocarbonyl-diphenylsulfone and sebacyl chloride. | do | 00.70 | 220–240 | 132 | >425 |
| 11 | 4,4'-dichlorocarbonyl-diphenylsulfone | 2,2-bis(4-hydroxyphenyl)propane and 1,6-hexanediol. | 00.59 | 220–240 | 155 | >350 |
| 12 | do | 2,2-bis(4-hydroxyphenyl)propane and 1,4'-bis(p-hydroxycumyl)benzene. | 00.20 | 195–240 | 200 | 495 |

It is apparent that a wide range of copolymers and terpolymers can be obtained in similar manner with a wide range of glass transistion temperatures and flow D882–64T with a testing speed of 0.05″/min. The excellent tensile properties of these polyesters are given in the table below:

| Polymer of Example | Solvent | Test temp., °C. | Elongation, percent | Yield strength, p.s.i. | 2% secant modulus, p.s.i |
|---|---|---|---|---|---|
| 1 | Monochlorobenzene | 23 | 18 | 11,500 | 114,000 |
| | | 23 | 16 | 10,800 | 107,000 |
| 2 | Dimethylformamide | 175 | 9 | 4,500 | 79,000 |
| | | 200 | 10 | 4,000 | 61,000 |
| | | 23 | 16 | 10,500 | 128,000 |
| 4 | o-Dichlorobenzene | 195 | 9 | 4,200 | 75,900 |
| | | 200 | 9 | 4,300 | 64,000 |
| 6 | do | 23 | 17 | 10,900 | 118,000 |
| 7 | do | 23 | 13 | 9,400 | 95,000 |
| 9 | do | 23 | 13 | 10,900 | 123,000 |
| 10 | do | 23 | 11 | 9,200 | 95,900 | temperatures. In general the addition of an aliphatic reactant lowers the glass transition temperature, flow temperature, and decomposition temperature obtained for wholly aromatic polyesters having similar molecular weights.

EXAMPLE 13

456 parts of 2,2-bis(4-hydroxyphenyl)propane, 236 parts of 1,6-hexanediol, 406 parts of terephthaloyl chloride, 686 parts of 4,4′-dichlorocarbonyldiphenylsulfone (equimolar quantities), 8 parts of powdered magnesium and 10,000 parts by volume of o-dichlorobenzene were charged to a vessel as in Example 1 and refluxed for 20 hours. The solution was filtered and poured into isopropanol. The precipitated product was washed with isopropanol and dried.

The reduced viscosity of the polymer was 0.4. The polymer had a softening point of 200° C. and a Tg of 115° C.

EXAMPLE 14

Following the procedure given in Example 5, various copolymers were prepared from 4,4′-dichlorocarbonyldiphenylsulfone, adipyl chloride and 2,2-bis(4-hydroxyphenyl)propane. The results are given below where it can be seen that flow temperatures, glass transition temperatures and decomposition temperatures increase with increasing 4,4′-dichlorocarbonyldiphenylsulfone content.

| Mol percent 4,4′-dichlorocarbonyldiphenylsulfone | Mol percent adipyl chloride | Tg, °C. | Flow temp., °C. | Decomposition temp., °C. |
|---|---|---|---|---|
| 20 | 80 | 70 | 130 | 300 |
| 40 | 60 | 143 | 240 | >350 |
| 45 | 55 | 150 | 245–270 | >350 |
| 50 | 50 | 160 | 290 | >350 |
| 70 | 30 | 180 | 260–290 | >360 |
| 100 | | 220 | 320 | >350 |

EXAMPLE 15

2508 parts of 2,2-bis(4-hydroxyphenyl)propane, 1210 parts of adipyl chloride, 1507 parts of 4,4′-dichlorocarbonyldiphenylsulfone, 20 parts of magnesium powder, and 35,000 parts of o-dichlorobenzene were charged to a reaction vessel and stirred at reflux temperatures. Samples were removed at intervals. The reduced viscosity and glass transition temperatures increased with increasing reaction time. Results are given below:

| Reaction time, hr.: | Reduced viscosity | Tg, °C. |
|---|---|---|
| 6.5 | 0.27 | 115 |
| 13 | 0.75 | 140 |
| 16.5 | 1.21 | 143 |

EXAMPLE 16

Clear films of several polyesters were cast from solution. The films were dried at 90–110° C. under reduced pressure, cut into tensile impact specimens according to ASTM D1822–61T, type L, and tested as per ASTM test

EXAMPLE 17

The polyesters of the invention have low water absorptivity as shown by the data given below. The polyesters were molded and specimens were exposed in a chamber maintained at 93% relative humidity for one month.

| | Compression molding | | | |
|---|---|---|---|---|
| Polymer of Example: | Temp., °C. | Pressure, tons | Time, min. | Percent water uptake |
| 7 | 230 | 10 | 2 | 0.48 |
| 9 | 255 | 10 | 2 | 0.50 |
| 10 | 230 | 10 | 2 | 0.40 |

EXAMPLE 18

Composites of glass cloth and the polyesters were prepared by dissolving the polyesters in o-dichlorobenzene, applying the solutions to the glass cloth, and evaporating the solvent. Excellent strengths were maintained at elevated temperatures as shown by the table below:

| Polymer of Example | Weight percent of glass | Test temp., °C. | Ultimate elongation, percent | Ultimate tensile strength, p.s.i. | 2% secant modulus, p.s.i. |
|---|---|---|---|---|---|
| 4 | 50 | 23 | 10 | 23,500 | 236,000 |
| | | 175 | 11 | 22,600 | 219,500 |
| | | 200 | 11 | 25,100 | 236,000 |
| | | 235 | 12 | 23,000 | 163,000 |
| 5 | 50 | 23 | 14 | 21,200 | 161,200 |
| | | 175 | 15 | 19,900 | 127,100 |
| | | 200 | 15 | 17,700 | 98,200 |
| | | 235 | 15 | 19,100 | 103,600 |
| 1 | 58 | 23 | 16 | 18,500 | 146,400 |
| | | 200 | 14 | 15,400 | 122,300 |
| | | 235 | 14 | 20,300 | 154,600 |
| Glass control | | 23 | 5 | 10,400 | |
| | | 175 | 9 | 4,300 | |
| | | 200 | | 7,700 | |
| | | 235 | | 7,100 | |

We claim:
1. An essentially linear, fiber- and film-forming polyester of 4,4′-dichlorocarbonyldiphenylsulfone and 2,2-bis (4′-hydroxyphenyl) - 1,1a,3,3a,4,5,5,5a,5b,6-decachlorooctahydro-1,3,4-metheno-2H-cyclobuta[cd] pentalene.

2. A process for preparing essentially linear fiber-and film-forming polyesters which comprises reacting a mixture of reactants comprising 4,4′ - dichlorocarbonyldiphenylsulfone and an aromatic dihydroxy compound wherein each hydroxy radical is attached directly to an aromatic ring carbon atom under anhydrous conditions in an inert solvent for said reactants at the reflux temperature of the solvent in the presence of a catalyst selected from the group consisting of magnesium metal, zinc metal, aluminum metal and cuprous chloride and recovering the product.

3. The process of claim 2 wherein the dihydroxy compound is 2,2-bis(4-hydroxyphenyl)propane or 1,4-bis(p-hydroxycumyl)benzene.

4. The process of claim 2 wherein the dihydroxy compound is 2,2-bis(4′-hydroxyphenyl)-1,1a,3,3a,4,5,5,5a,5b, 6 - decachlorooctahydro - 1,3,4 - metheno-2H-cyclobuta[cd]pentalene.

References Cited
UNITED STATES PATENTS

| | | |
|---|---|---|
| 3,110,547 | 11/1963 | Emmert. |
| 3,160,602 | 12/1964 | Kantor et al. |
| 3,216,970 | 11/1965 | Conix. |
| 3,223,752 | 12/1965 | Tate et al. |
| 3,251,805 | 5/1966 | Schnell et al. |
| 3,271,365 | 9/1966 | Parham. |
| 3,297,633 | 1/1967 | Hindersinn et al. |
| 3,350,354 | 10/1967 | Watson. |
| 3,374,202 | 3/1968 | Schwarz. |
| 3,398,121 | 8/1968 | Oxenrider et al. |
| 3,438,938 | 4/1969 | Oxenrider et al. |

FOREIGN PATENTS

| | | |
|---|---|---|
| 1,317,030 | 12/1962 | France. |

WILLIAM H. SHORT, Primary Examiner

L. P. QUAST, Assistant Examiner

U.S. Cl. X.R.

117—126; 260—32.6; 33.8, 47, 75